May 23, 1944. E. GISONDI 2,349,547
FASTENING DEVICE
Original Filed July 24, 1941
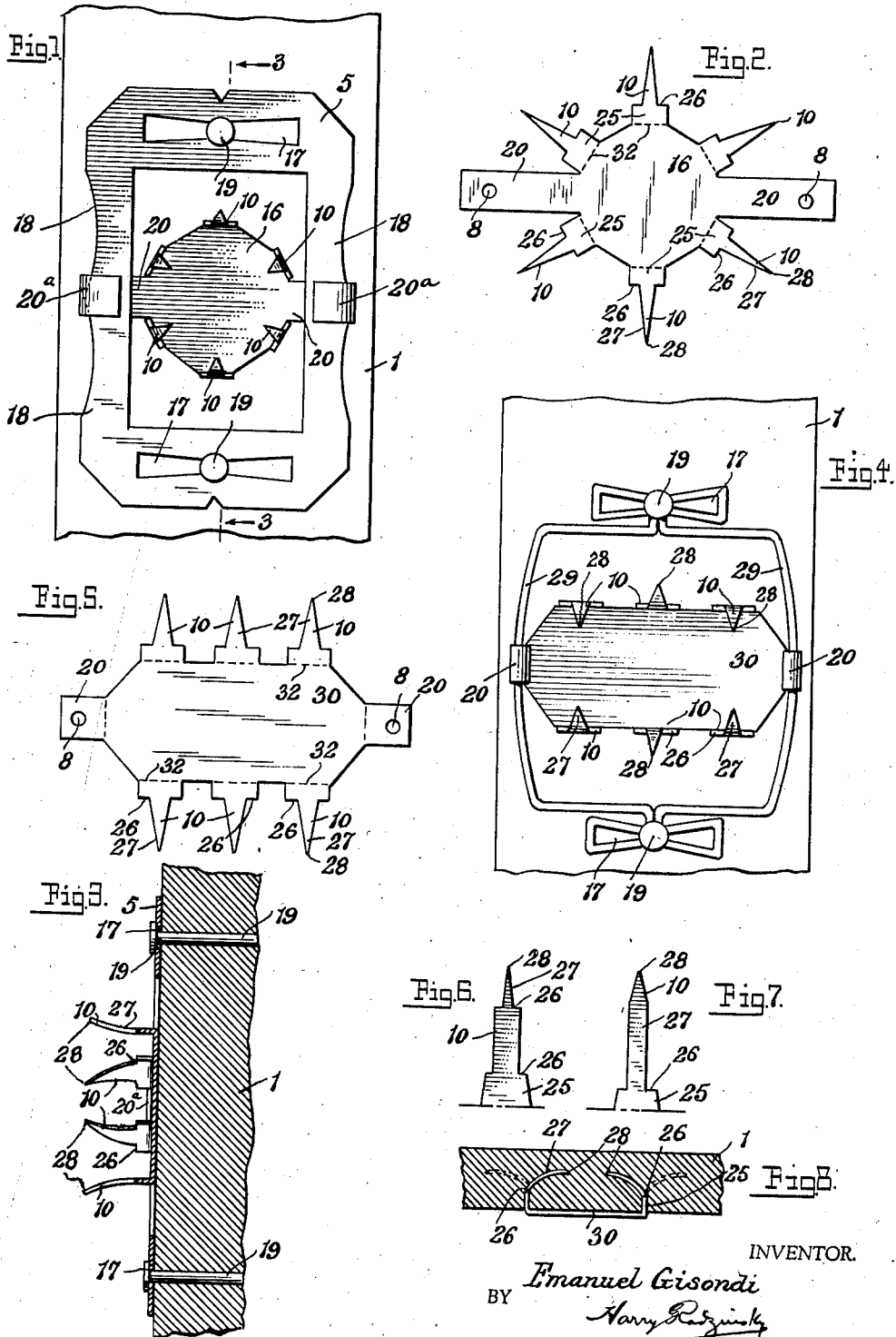
INVENTOR.
Emanuel Gisondi
BY Harry Radzinsky
Attorney Patented May 23, 1944

2,349,547

UNITED STATES PATENT OFFICE 2,349,547

FASTENING DEVICE

Emanuel Gisondi, Larchmont, N. Y.

Original application July 24, 1941, Serial No. 403,871. Divided and this application May 20, 1943, Serial No. 487,706

6 Claims. (Cl. 72—118)

This invention relates to fastening devices, and particularly to those of the type adapted for use in building construction for attaching wall board and similar penetrable sheet material to studs or other parts of the structure.

This application is a division of my co-pending application Serial No. 403,871 filed July 24, 1941.

An object of the invention is to provide a fastener of this character of the so-called "blind" type wherein prongs are provided which penetrate the panel from the rear and clench over within the panel without penetrating completely through it, and accordingly without being discernible from the front of the panel.

The invention contemplates the provision of an adjustable fastener of this character, and which not only enables the attachment of the paneling or wall board to be greatly simplified, but which, because of its adjustability in several directions, enables the attached board to be held properly in position and capable of being shifted to permit easy attachment of the wall board, and also capable of shifting itself to compensate for expansion and contraction of the support to which it is attached.

In the accompanying drawing, wherein several of the embodiments of the invention are shown, Fig. 1 is a front view of one form of fastening device attached to a stud; Fig. 2 is a face view of the pronged member forming a part of the fastening device; Fig. 3 is a sectional view on the line 3—3 of Fig. 1, looking in the direction of the arrows; Fig. 4 is a front view of a modified form of fastening device; Fig. 5 is a face view of the pronged member forming a part of the fastening device shown in Fig. 4; and Figs. 6 and 7 show several forms of prongs for employment as part of the pronged members of Figs. 2 and 5; and Fig. 8 is a sectional view through a piece of sheet material, showing how the fastener member prongs bend therein.

In the structure of Fig. 1, a piece of lumber such as a stud, is shown at 1, and attached to the face of the stud by the two spaced nails or other fasteners 19, is a sheet-metal, stamped-out frame 5 constituting the body portion of the fastening device. This frame is adapted to hold a pronged plate such as shown at 16 in Fig. 2, or as shown at 30 in Fig. 5, or any other similar type of pronged fastener constructed according to this invention. The combination of the frame 5 and the pronged plate 16 supported thereby, provides a sliding, floating, invisible fastening device of the so-called "blind" type. The frame 5 is formed near its opposite ends with two nail slots 17, said slots being tapered and being widest at their ends whereby the frame may not only shift transversely of the stud 1 on the nails 19, but also angularly, if such movement is needed.

The sheet-metal pronged plate 16 is provided with a plurality of radially extending tongues or prongs, which are hereinafter described in detail, and which curl or clench over within the wall board or other penetrable sheet material to thereby support the wall board. The fastener also has two integral tongues 20, which are bent around the segmentally shaped side members 18 of the frame as clearly indicated at 20a. This arrangement, in which the pronged plate is slidably confined between the frame 5 and stud 1, allows vertically shifting movement or adjustment of the pronged plate relatively to the frame 5, but also permits angular shifting movement of the plate.

The prongs 10 formed on the plates 16 and 30 may be made in a number of different forms to suit various requirements and particularly to suit the material adapted to be engaged by them. The prongs used are preferably made with a number of stepped sections; the wider portion 25 of the prong is situated adjacent to the base or body of the plate on which the prong is formed. Located at a predetermined distance from the point of connection of the prong with the base or body of the fastener, is a step or shoulder 26, and projecting therefrom is a thinner or narrower portion 27 which may gradually taper until it terminates in a needle-like point 28. The arrangement of this type of prong is such that in use the needle-like termination or point 28 first penetrates into the wall board and starts to bend over therein. When the prong is inserted into the wall board to such an extent that the shoulder 26 starts to enter into the board, a greater resistance to penetration occurs and bending of the narrower portion of the prong takes place. The actual point of bend of the narrower or thinner portion of the prong is the shoulder 26. Accordingly, the position of this shoulder with relation to the entire length of the prong is that which determines the extent of penetration of the prong within the wall board. Thus, if it is desired that the prong penetrate for a considerable distance through the board, the shoulder 26 will be located relatively close to the point of joinder of the entire prong with the base portion of the plate, such as is shown in Fig. 7. On the other hand, when a relatively shallow penetration of the prong into the board is desired, the shoulder 26, or point of bend of the prong, will be relatively remote from the point of joinder of the prong to the base portion of the fastener. Thus, by the position of this shoulder, or of several of such shoulders, as shown in Fig. 6, the bending of the prong can be controlled, and resultantly the extent to which the prong penetrates into the wall board is also governed.

It will also be noted that the prongs are inclined or partly bent over, as clearly seen in Figs. 3 and 8, so that as they are forced into the wall board the bending in the direction in which they are already inclined increases, so that a clenching action of the prongs will take place within the body of the wall board.

In Fig. 4 is shown a supporting frame for a pronged plate, said frame being indicated at 29 and being composed of wire. This frame functions similarly to the sheet-metal frame 5, and has arcuately arranged side members 31 on which the curled-over portions of the tongues 20 on the pronged fastener plate 30 are located and which are capable of vertical and angular movement thereon. The prongs 10 on the plate 30 are similar in construction to those previously described.

While the pronged plates 13 and 30 are adapted for use in connection with frames of the types shown at 5 and 29, these pronged plates are also capable of use by being directly and fixedly attached to the studs of other supports. For this purpose the plates may be perforated, as at 8 and at several other points to enable nails to be driven through them to thereby fasten them directly to the lumber.

In use the prongs 10 on the plates 16 and 30 are bent laterally, substantially on the lines 32 so that they project forwardly and are curled over toward one another as indicated in Fig. 3. The wall board is then driven onto the prongs, which curl over within the board without penetrating entirely through it. The plates 16 and 30, being shiftable on the frame, and the frame being shiftable on the stud or other support to which it is secured, provides an adjustability which not only greatly facilitates simplified attachment of the wall board panels, but also holds the panels with a floating action during expansion of the frame or supports to which the fastening members are attached.

What I claim is:

1. A fastener for wall board comprising a retaining member secured to a beam by means permitting bodily shifting movement of said member relative to the beam, a fastener comprising a sheet metal pronged element slidably engaging said retaining member and mounted for shifting movement relative thereto, the prongs on said fastening member adapted for penetrable engagement with wall board.

2. A fastener for wall board comprising a frame for attachment to the face of a beam, said frame having slots through which fastening nails are extended, said slots having angular portions whereby the frame can be bodily shifted on the nails either transversely of the beam or angularly thereto, a flat sheet metal fastener maintained between the back of the frame and the face of the beam, said fastener having prongs for engagement with wall board and having parts extending around parts of the frame, the parts on the fastener being slidable on the frame whereby the fastener may be shifted relatively to the frame.

3. A fastener for wall board comprising a frame for attachment to the face of a beam, said frame being provided with slots through which nails are extended to penetrate the beam, said slots having angular portions whereby the frame can be shifted on the nails either directly transversely of the beam or angularly thereto, a flat sheet metal fastener maintained between the back of the frame and the face of the beam, said fastener having prongs for engagement with the wall board and having portions extending around parts of the frame, said portions being slidable on the frame whereby the fastener may be shifted relatively to the frame, the portions of the frame engaged by the fastener parts being segmental whereby the fastener may be shifted angularly on the frame.

4. A fastener for wall board comprising, a frame held flatwisely against a support, means for attaching said frame to the support whereby the frame may be angularly shifted on the support, a sheet metal fastener for engaging the wall board, said fastener being held by the frame and adjustable relatively thereto, said fastener having tongue portions bent around parts of the frame and forming guides for directing the shifting movement of the fastener on the frame.

5. A fastening device for wall board comprising, a frame of substantially rectangular form for attachment to a support, said frame having spaced side bars and a central opening located between them, a pronged plate located in the opening and provided with prongs extending forwardly therethrough, said pronged plate having tongues extending between the side bars and the support and bent around said side bars and over the front of the same to hold the pronged plate attached to the frame, the side bars being arcuately curved to permit angular shifting movement of the pronged plate within the opening in the frame.

6. A fastening device for wall board comprising, a sheet metal frame of substantially rectangular form, said frame consisting of end members connected by integrally formed side bars, the end members being formed with lengthy slots for the passage of fastening nails to attach the frame to a support, said slots being widened toward their ends to permit angular movement of the frame on the fastening nails, a pronged metal plate disposed within the frame and provided with tongues located between the back of the side bars and the face of the support to which the frame is attached, said tongues being bent around the side bars and extended forwardly over the front face of the same, the side bars being arcuately curved to permit angular shifting movement of the plate relative to it.

EMANUEL GISONDI.